United States Patent
Baum

(10) Patent No.: US 7,688,711 B2
(45) Date of Patent: Mar. 30, 2010

(54) METHOD AND APPARATUS FOR TRANSFORMING A DIGITAL AUDIO SIGNAL AND FOR INVERSELY TRANSFORMING A TRANSFORMED DIGITAL AUDIO SIGNAL

(75) Inventor: Peter Georg Baum, Hannover (DE)

(73) Assignee: Thomson Licensing, Boulogne Billancourt (FR)

( * ) Notice: Subject to any disclaimer, the term of this patent is extended or adjusted under 35 U.S.C. 154(b) by 837 days.

(21) Appl. No.: 10/589,648

(22) PCT Filed: Feb. 4, 2005

(86) PCT No.: PCT/EP2005/001119

§ 371 (c)(1),
(2), (4) Date: Aug. 16, 2006

(87) PCT Pub. No.: WO2005/078600

PCT Pub. Date: Aug. 25, 2005

(65) Prior Publication Data

US 2007/0203695 A1    Aug. 30, 2007

(30) Foreign Application Priority Data

Feb. 17, 2004    (EP)   .................................. 04090051

(51) Int. Cl.
*H04J 11/00* (2006.01)
(52) U.S. Cl. .................. 370/210; 370/203; 370/208
(58) Field of Classification Search .............. 370/210, 370/203, 204, 205, 206, 207, 208, 209
See application file for complete search history.

(56) References Cited

U.S. PATENT DOCUMENTS 6,137,824 A * 10/2000 Liu ............................ 375/130
2004/0220805 A1   11/2004 Geiger et al.

FOREIGN PATENT DOCUMENTS

WO    WO 02/103684    12/2002

OTHER PUBLICATIONS

H. Cagler et al. "Permutation based design of orthogonal block transforms and filter banks" Multidimensional Systems and Signal Processing, No. 12, 2001, pp. 63-79.*
H. Caglar et al. "Permutation based design of orthogonal block transforms and filter banks", Multidimensional Systems and Signal Processing, No. 12. 2001. pages 63-79.
S. Gunturk et al., "Design of multiplier-free orthogonal block transforms and filter banks with integer arithmetic" Technical Report, 1996, pp. 1-14.

(Continued)

*Primary Examiner*—Huy D Vu
*Assistant Examiner*—Adnan Baig
(74) *Attorney, Agent, or Firm*—Robert D. Shedd; Paul P. Kiel

(57) ABSTRACT

A known time domain to frequency domain or frequency domain to time domain transform used in audio codecs is MDCT, which has the disadvantage of being costly in terms of required computational power due to high-precision multiplications, but which facilitates overlapping transform and subsampling. The invention uses a transform or inverse transform which does not involve multiplications because the transform and inverse transform matrices include '+1' and '−1' values only, but whereby the advantages of overlapping and subsampling are kept.

6 Claims, 1 Drawing Sheet

OTHER PUBLICATIONS

Figure 1A:
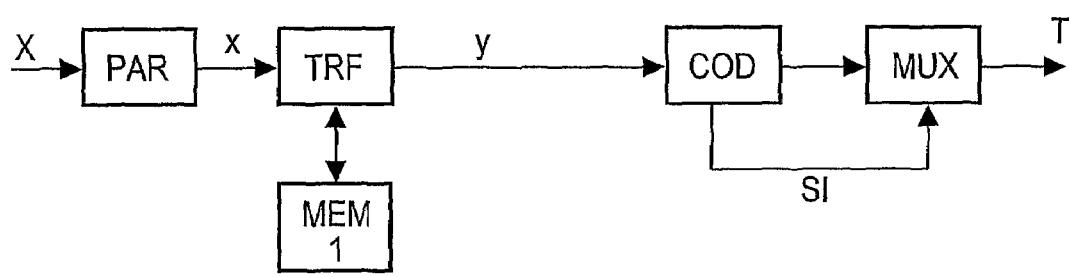

Che-Ho Wei et al: "An acoustic echo canceller using lapped orthogonal transform" Proceedings of the IEEE International Symposium on Circuit and Systems 1997, Jun. 9-12, 1997, vol. 4, pp. 2573-2576.
S-M Phoong et al., "Lapped Hadamad transforms and filter banks", Proceedings of IEEE International Conference on Acoustics, Speech and Signal Processing 2003, Apr. 3-10, 2003, vol. 6, pp. VI 509-VI 512.
R.L. De Queiroz, "Lapped Transforms", in The Transforms and Applications Handbook-Second Edition, Poularikas, 2000.
Search Report Dated Mar. 14, 2005.

* cited by examiner

METHOD AND APPARATUS FOR TRANSFORMING A DIGITAL AUDIO SIGNAL AND FOR INVERSELY TRANSFORMING A TRANSFORMED DIGITAL AUDIO SIGNAL

This application claims the benefit, under 35 U.S.C. §365 of International Application PCT/EP05/001119, filed Feb. 4, 2005, which was published in accordance with PCT Article 21(2) on Aug. 25, 2005 in English and which claims the benefit of European patent application No. 04090051.6, filed Feb. 17, 2004.

The invention relates to a method and to an apparatus for transforming a digital audio signal from the time domain into a different domain, and for inversely transforming a transformed digital audio signal into the time domain.

BACKGROUND

Known time domain to frequency domain or frequency domain to time domain transformations used in codecs include the Discrete Cosine Transform (DCT) or the Modified Discrete Cosine Transform (MDCT). Both types of transformation have the disadvantage that they are costly in terms of required computational power since the computation involves multiplications with a much higher precision than that of both the input and the output values. E.g. in audio codecs, based on 16 bit integer input samples and output values, in many cases the internal computations are carried out with at least 32 bit fixed point or floating point precision. The input values are multiplied with cosine values, which often are memorised in look-up tables to reduce the processing power load. But such tables consume valuable memory capacity which is precious in particular in embedded systems like audio players or mobiles phones.

The Hadamard transformation does not use any such multiplications but uses matrices consisting only of '+1' and '−1' values. But using a Hadamard transform leads to reduced coding quality or increased bitrate.

The major advantage of the MDCT over the DCT is its lapped nature, i.e. each input sample is transformed twice and each output sample is the sum of two inverse transforms, which has the effect that quantisation effects are averaged and noise introduced by a is completely cancelled in the optimum case. By subsampling following the overlapping the MDCT transformed signal has as many samples as the input signal. This feature is not feasible when using a Hadamard transform. If an overlap of 50% is chosen, there are also 50% more transformed samples, which fact contradicts the compression goal and has strong drawbacks on transmission.

INVENTION

Most audio codecs transform their input data from time (or space) domain to another domain (frequency domain), in which compression and quantisation is carried out. However, DCT or MDCT transformation is costly in terms of computation power and memory.

A problem to be solved by the invention is to provide a transform and a corresponding inverse transform which has the advantages of MDCT but requires less computational power. This problem is solved by the methods disclosed in claims 1 and 2. Corresponding apparatuses that utilise these methods are disclosed in claims 3 and 4, respectively.

The invention solves this problem by constructing a transformation or inverse transformation which does not use any multiplication apart from a single scaling, and which still keeps the advantages of MDCT like overlapping and subsampling. The related N*N full matrix is constructed by a combination of two different N/2-rows N/4-columns sub-matrices and reversed-column-order versions of these sub-matrices, whereby the sub-matrices and thereby the (N/2)*N transformation matrix and the N*N full matrix contain '+1' and '−1' values only.

The inventive transformation also represents a change between time domain and another domain. With proper overlap and subsampling it is perfectly reconstructing. The inventive transformation is very cheap in terms of computation power and memory, since it does not use any multiplications or high precision coefficient tables. Furthermore the inventive transformation overlaps by 50% in the time domain which reduces quantisation artifacts. At the same time it uses subsampling by a factor of '2', i.e. a transformation of length N samples results in N/2 transformed values. No separate subsampling step is required. In combination with the overlap a stream of L samples results in L transformed values (apart from a lead in and out) and in L inversely transformed values. Advantageously, apart from the much lower computing requirements the characteristics of the inventive transform are very similar to that of the MDCT:

'smearing' of quantisation effects over the whole transformation length, 50% overlap so that quantisation artifacts are averaged or even cancelled out, subsampling so that despite a 50% overlap the number of transformed values is equal to the number of input values.

In principle, the inventive methods are suited for: transforming in an audio signal processor a digital audio signal from the time domain into a different domain, including the method steps:

forming partitions of transform length N from said digital audio signal, which partitions overlap by N/2, wherein N is an integer multiple of '4';

performing a multiplication of a transform matrix Mh, said transform matrix having a size of N/2 rows and N columns, with each one of said partitions such that succeeding transformed signal partitions are provided, wherein said transform matrix is constructed in the form:

$$Mh=[a lr(a) b lr(-1*b)],$$

wherein 'a' and 'b' are sub-matrices each having N/2 rows and N/4 columns and including '+1' and '−1' values only, and wherein said sub-matrices are linearly independent, whereby said transform matrix multiplication outputs N/2 output values per N input values representing a subsampling by a factor of '2', thereby forming a transformed digital audio signal, and for inversely transforming in an audio signal processor a transformed digital audio signal into the time domain, which transformed digital audio signal was constructed by the steps:

forming partitions of transform length N from an original digital audio signal, which partitions were overlapping by N/2, wherein N is an integer multiple of '4';

performing a multiplication of a transform matrix, said transform matrix Mh having a size of N/2 rows and N columns, with each one of said partitions such that succeeding transformed signal partitions were provided, wherein said transform matrix was constructed in the form Mh=[a lr(a) b lr(−1*b)], wherein 'a' and 'b' were sub-matrices each having N/2 rows and N/4 columns and including '+1' and '−1' values only, and wherein said sub-matrices are linearly independent, whereby said transform matrix multiplication had output N/2 output values per N input values representing a subsampling by a factor of '2', thereby having formed a transformed digital audio signal, including the method steps:
  performing a multiplication of an inverse transform matrix invMh, said inverse transform matrix having a size of N rows and N/2 columns, with each one of said transformed signal partitions such that succeeding inversely transformed signal partitions of length N are provided, wherein said inverse transform matrix invMh is constructed by taking the left half of the inverse of a matrix $$\begin{bmatrix} a\ lr(a) & b\ lr(-1*b) \\ b\ lr(-1*b) & a\ lr(a) \end{bmatrix},$$

wherein 'a' and 'b' are sub-matrices as defined above;
  assembling said inversely transformed signal partitions in an overlapping manner so as to form an inversely transformed digital audio signal, whereby said overlapping is of size N/2, and whereby the samples values of said inversely transformed signal partitions, or the samples values of said inversely transformed digital audio signal, or the values of said transformed signal partitions are each scaled by multiplication with factor '1/N' or by a division by 'N' or by a corresponding binary shift operation.

In principle, the inventive apparatus for transforming a digital audio signal from the time domain into a different domain includes:
  means which form partitions of transform length N from said digital audio signal, which partitions overlap by N/2, wherein N is an integer multiple of '4';
  means which perform a multiplication of a transform matrix Mh, said transform matrix having a size of N/2 rows and N columns, with each one of said partitions such that succeeding transformed signal partitions are provided, wherein said transform matrix is constructed in the form:

$Mh=[alr(a)blr(-1*b)]$, wherein 'a' and 'b' are sub-matrices each having N/2 rows and N/4 columns and including '+1' and '−1' values only, and wherein said sub-matrices are linearly independent, whereby said transform matrix multiplication means output N/2 output values per N input values representing a subsampling by a factor of '2', thereby forming a transformed digital audio signal.

In principle, the inventive apparatus for inversely transforming a transformed digital audio signal, which was constructed by the steps:
  forming partitions of transform length N from an original digital audio signal, which partitions were overlapping by N/2, wherein N is an integer multiple of '4';
  performing a multiplication of a transform matrix, said transform matrix Mh having a size of N/2 rows and N columns, with each one of said partitions such that succeeding transformed signal partitions were provided, wherein said transform matrix was constructed in the form Mh=[a lr(a) b lr(−1*b)], wherein 'a' and 'b' were sub-matrices each having N/2 rows and N/4 columns and including '+1' and '−1' values only, and wherein said sub-matrices are linearly independent, whereby said transform matrix multiplication had output N/2 output values per N input values representing a subsampling by a factor of '2', thereby having formed a transformed digital audio signal, into the time domain includes:
  means which perform a multiplication of an inverse transform matrix invMh, said inverse transform matrix having a size of N rows and N/2 columns, with each one of said transformed signal partitions such that succeeding inversely transformed signal partitions of length N are provided, wherein said inverse transform matrix invMh is constructed by taking the left half of the inverse of a matrix $$\begin{bmatrix} a\ lr(a) & b\ lr(-1*b) \\ b\ lr(-1*b) & a\ lr(a) \end{bmatrix},$$

wherein 'a' and 'b' are sub-matrices as defined above;
  means which assemble said inversely transformed signal partitions in an overlapping manner so as to form an inversely transformed digital audio signal, whereby said overlapping is of size N/2, and whereby the samples values of said inversely transformed signal partitions, or the samples values of said inversely transformed digital audio signal, or the values of said transformed signal partitions are each scaled by multiplication with factor '1/N' or by a division by 'N' or by a corresponding binary shift operation.

Advantageous additional embodiments of the invention are disclosed in the respective dependent claims.

DRAWING

Exemplary embodiments of the invention are described with reference to the accompanying drawing, which shows in:
  FIG. 1 Simplified block diagram for the inventive transformation in an audio signal processor, and for the inventive inverse transformation in an audio signal processor.

EXEMPLARY EMBODIMENTS

In FIG. 1a a digital input audio signal X is fed to a partitioner PAR in which corresponding partitions x of length N from signal X are formed. The partitions x are transformed in a transform stage TRF, which gets transform matrix values Mh from a memory MEM1, from the time domain into a different domain, thereby providing the transformed output signal y. Advantageously, the transformed x signal partitions are already subsampled by a factor of two so that no extra subsampler is required. This signal can be encoded in a coder COD including e.g. quantising, bit allocation and/or variable length coding, whereby the resulting data rate is reduced and encoding side information SI (for example encoding parameters) can be generated. The encoded audio signal is multiplexed in stage MUX with the side information SI, thereby providing a signal T to be transferred.

Figure 1B:
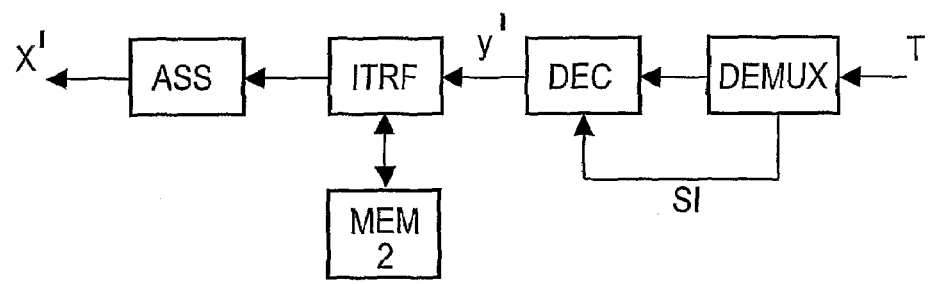

In FIG. 1b the transferred signal T is fed to a demultiplexer stage DEMUX, which provides an encoded audio signal together with side information SI to a decoder DEC. In DEC the encoded audio signal is decoded using said side information SI (for example encoding/decoding parameters), including e.g. variable length decoding and/or inverse quantisation, and is thereafter fed as signal y' to an inverse length-N transformer ITRF, which gets inverse transform matrix values invMh from a memory MEM2, and which transforms from said different domain back to the time domain. In stage ASS the corresponding signal partitions x' of length N are assembled in an overlapping manner thereby providing the digital output audio signal X'.

The transformation of length N in transformer TRF is carried out in an encoder such that in each case a corresponding partition x of length N of a digital input audio signal X of length L is transformed into a transformed signal y of length N. This transformed signal y is transformed back in a decoder in the inverse transformer ITRF to a corresponding partition x' of an output signal X' such that X' equals X. This is true, if the first N/2 and the last N/2 samples of signal X are zero and L is an integer multiple of N/2. Since each input signal X can be padded accordingly this means no loss of generality.

The transformation length N must be an integer multiple of '4', i.e. n=N/4, n and N being integer numbers. The (N/2)*N transformation matrix Mh has the form:

$$Mh = [a\,lr(a)\,b\,lr(-1*b)],$$

where 'a' and 'b' are sub-matrices having 2*n rows and n columns consisting of only '+$_1$' and '−1' values or elements. E.g. "lr(a)" means that the columns or elements of sub-matrix 'a' are reversed in order, i.e. lr([1 2 3 4]) becomes [4 3 2 1].

An N*N full matrix MhFull is defined by:

$$MhFull = \begin{bmatrix} a\,lr(a) & b\,lr(-1*b) \\ b\,lr(-1*b) & a\,lr(a) \end{bmatrix}$$

The sub-matrices 'a' and 'b' are chosen such that their rows are linearly independent from each other, i.e.

rank[MhFull]=N.

Advantageously, the inverse full matrix invMhFull is the inverse of full matrix MhFull scaled by N, so that the inverse full matrix invMhFull consists of only '+1' and '−1' values, too: invMhFull=inv[MhFull]*N=N*[MhFull]$^{-1}$. The inverse transformation matrix invMh is formed by taking the left half of inverse full matrix invMhFull. In 'Matlab' software notation:

invMh=invMhFull[:,1:(N/2)].

Therein "[:," denotes that all rows are taken, "1:(N/2)]" denotes that columns 1 to N/2 are taken.

An example transformation matrix for N=8 is:

$$Mh = \begin{bmatrix} 1 & 1 & 1 & 1 & -1 & 1 & -1 & 1 \\ 1 & 1 & 1 & 1 & 1 & -1 & 1 & -1 \\ 1 & -1 & -1 & 1 & -1 & -1 & 1 & 1 \\ 1 & -1 & -1 & 1 & 1 & 1 & -1 & -1 \end{bmatrix}$$

The corresponding full matrix is:

$$MhFull = \begin{bmatrix} 1 & 1 & 1 & 1 & -1 & 1 & -1 & 1 \\ 1 & 1 & 1 & 1 & 1 & -1 & 1 & -1 \\ 1 & -1 & -1 & 1 & -1 & -1 & 1 & 1 \\ 1 & -1 & -1 & 1 & 1 & 1 & -1 & -1 \\ -1 & 1 & -1 & 1 & 1 & 1 & 1 & 1 \\ 1 & -1 & 1 & 1 & 1 & 1 & 1 & 1 \\ -1 & -1 & 1 & 1 & 1 & -1 & -1 & 1 \\ 1 & 1 & -1 & -1 & 1 & -1 & 1 & 1 \end{bmatrix}$$

The corresponding inverse full matrix following multiplication with N is:

$$invMhFull = \begin{bmatrix} 1 & 1 & 1 & 1 & -1 & 1 & -1 & 1 \\ 1 & 1 & -1 & -1 & 1 & -1 & -1 & 1 \\ 1 & 1 & -1 & -1 & -1 & 1 & 1 & -1 \\ 1 & 1 & 1 & 1 & 1 & -1 & 1 & -1 \\ -1 & 1 & -1 & 1 & 1 & 1 & 1 & 1 \\ 1 & -1 & -1 & 1 & 1 & 1 & -1 & -1 \\ -1 & 1 & 1 & -1 & 1 & 1 & -1 & -1 \\ 1 & -1 & 1 & -1 & 1 & 1 & 1 & 1 \end{bmatrix}$$

The corresponding inverse transformation matrix is:

$$invMh = \begin{bmatrix} 1 & 1 & 1 & 1 \\ 1 & 1 & -1 & -1 \\ 1 & 1 & -1 & -1 \\ 1 & 1 & 1 & 1 \\ -1 & 1 & -1 & 1 \\ 1 & -1 & -1 & 1 \\ -1 & 1 & 1 & -1 \\ 1 & -1 & 1 & -1 \end{bmatrix}$$

With nTransforms=L/(N/2), i.e. the total length of input signal X divided by one half of the transform length equals the total number of transforms carried out on input signal X. For practical implementation, the value 'L' used does not correspond to the total length of audio signal X (e.g. the number of samples in 5 or 74 minutes) but to a usual audio coding frame length, e.g. in the range of 100 to 3000 samples. The transformation of the partitions x of input audio signal X from the time domain into a different domain is carried out as follows (in 'Matlab' software notation):

```
y = zeros (N/2, nTransforms);
for k = 0:(nTransforms-1)
    y(:, k+1) = Mh * x((1:N) + k*N/2);
end
```

The first line means that a matrix or a data field 'y' is generated which has N/2 rows and nTransforms columns, all of which are filled with 101 values.

According to the next line, k runs from '0' to (nTransforms-1) in the 'for' loop.

The third line expresses that the transformation matrix Mh is multiplied with an input signal vector x having the elements x(1+k*N/2) to x(N+k*N/2), each one of these multiplications yielding a vector having N/2 elements. The resulting (N/2)*nTransforms matrix is assigned to y.

The overlap of the transforms by N/2 is apparent. The transform coefficients of the overlapping partitions 'y' are subsampled by a factor of two.

The corresponding inverse transformation of the coefficients of the partitions y of the transformed signal of the different domain into corresponding partitions x' of the signal X' in the time domain is carried out as follows (in 'Matlab' software notation):

```
x' = zeros (L, 1);
for k = 0:(nTransforms-1)
    idx = (1:N) + k*N/2;
    x'(idx) = x'(idx) + invMh * y(:,k+1);
end
x' = x'/N
```

The first line means that a matrix or a data field x' is generated which has L rows and a single column, all of which are filled with '0' values.

According to the next line, k runs from '0' to (nTransforms-1) in the 'for' loop.

The third line defines a parameter set idx having the elements (1+k*N/2) to (N+k*N/2).

The fourth line expresses that the inverse transformation matrix invMh is multiplied with a partial matrix of y consisting of all rows of matrix y and column k+1 of matrix y, whereby the resulting vectors each having N/2 elements are summed up to form signal x'.

Since both the transform matrix Mh and the inverse matrix invMh consist only of '+1' and '−1' values, the scaling in the last line is the only multiplication (by factor '1/N'), or division by 'N', in this transformation/inverse transformation, which multiplication or division can be implemented as a shift operation in case N is a power of '2'. As an alternative, the transformed input values of the inverse transform can be scaled instead. Advantageously, all other operations can be implemented as sums and differences. By the overlapping, quantisation artifacts are averaged or even cancelled. Following the inverse transform, the alias introduced by the subsampling is also cancelled, i.e. a 'perfect reconstruction' is achieved.

As an alternative, the invention can be carried out with correspondingly transposed transform and inverse transform matices, i.e. matrix Mh has N rows and N/2 columns, whereas matrix invMh has N/2 rows and N columns.

The invention can be applied in audio coding/decoding, in audio data compression and in audio data transmission, storage and reproduction.

The invention claimed is:

1. Method, comprising:
   receiving by an audio signal processor a digital audio signal in the time domain; and
   transforming by the audio signal processor the digital audio signal from the time domain into a different domain, comprising:
   forming partitions of transform length N from said digital audio signal, which partitions overlap by N/2, wherein N is an integer multiple of '4';
   performing a multiplication of a transform matrix Mh, said transform matrix having a size of N/2 rows and N columns, with each one of said partitions such that succeeding transformed signal partitions are provided,
   wherein said transform matrix is constructed in the form:

$Mh = [a \; lr(a) \; b \; lr(-1*b)]$, wherein 'a' and 'b' are sub-matrices each having N/2 rows and N/4 columns and including '+1' and '−1' values only,
   and wherein lr( ) means that columns or elements of a sub-matrix are reversed in order, and wherein 'a' and 'b' are chosen such that a matrix $$MhFull = \begin{bmatrix} a \; lr(a) & b \; lr(-1*b) \\ b \; lr(-1*b) & a \; lr(a) \end{bmatrix}$$

has the rank N,
   whereby said transform matrix multiplication outputs N/2 output values per N input values representing a subsampling by a factor of '2', thereby forming a transformed digital audio signal.

2. Method for inversely transforming a digital audio signal, which digital audio signal was constructed by the steps:
   forming partitions of transform length N from an original digital audio signal, which partitions were overlapping by N/2, wherein N is an integer multiple of '4';
   performing a multiplication of a transform matrix Mh, said transform matrix having a size of N/2 rows and N columns, with each one of said partitions (x) such that succeeding transformed signal partitions were provided,
   wherein said transform matrix was constructed in the form Mh=[a lr(a) b lr(−1*b)], wherein 'a' and 'b' were sub-matrices each having N/2 rows and N/4 columns and including '+1' and '−1' values only,
   and wherein lr( ) means that columns or elements of a sub-matrix were reversed in order, and wherein 'a' and 'b' were chosen such that a matrix $$MhFull = \begin{bmatrix} a \; lr(a) & b \; lr(-1*b) \\ b \; lr(-1*b) & a \; lr(a) \end{bmatrix}$$

has the rank N,
   whereby said transform matrix multiplication had output N/2 output values per N input values representing a subsampling by a factor of '2', thereby having formed a transformed digital audio signal,
   said method including the steps:
   receiving by an audio signal processor the digital audio signal; and
   transforming by the audio signal processor the digital audio signal into the time domain, comprising:
   performing a multiplication of an inverse transform matrix invMh, said inverse transform matrix having a size of N rows and N/2 columns, with each one of said transformed signal partitions such that succeeding inversely transformed signal partitions of length N are provided,
   wherein said inverse transform matrix invMH is constructed by taking the left half of the inverse of the matrix $\begin{bmatrix} a \; lr(a) & b \; lr(-1*b) \\ b \; lr(-1*b) & a \; lr(a) \end{bmatrix}$, wherein 'a' and 'b' are sub-matrices as defined above;
   assembling said inversely transformed signal partitions in an overlapping manner so as to form an inversely transformed digital audio signal, whereby said overlapping is of size N/2,
   and whereby the samples values of said inversely transformed signal partitions, or the samples values of said inversely transformed digital audio signal, or the values of said transformed signal partitions are each scaled by multiplication with factor '1/N' or by a division by 'N' or by a corresponding binary shift operation.

3. Apparatus for transforming a digital audio signal from the time domain into a different domain, said apparatus including:
  means which form partitions of transform length N from said digital audio signal, which partitions overlap by N/2, wherein N is an integer multiple of '4';
  means which perform a multiplication of a transform matrix Mh, said transform matrix having a size of N/2 rows and N columns, with each one of said partitions such that succeeding transformed signal partitions are provided, wherein said transform matrix is constructed in the form:

$$Mh = [a\, lr(a)\, b\, lr(-1*b)],$$

wherein 'a' and 'b' are sub-matrices each having N/2 rows and N/4 columns and including '+1' and '−1' values only,
  and wherein lr( ) means that columns or elements of a sub-matrix are reversed in order,
  and wherein 'a' and 'b' are chosen such that a matrix $$MhFull = \begin{bmatrix} a\, lr(a) & b\, lr(-1*b) \\ b\, lr(-1*b) & a\, lr(a) \end{bmatrix}$$

has the rank N,
  whereby said transform matrix multiplication means output N/2 output values per N input values representing a subsampling by a factor of '2', thereby forming a transformed digital audio signal.

4. Apparatus for inversely transforming a transformed digital audio signal into the time domain, which transformed digital audio signal was constructed by the steps:
  forming partitions of transform length N from an original digital audio signal, which partitions were overlapping by N/2, wherein N is an integer multiple of '4';
  performing a multiplication of a transform matrix Mh, said transform matrix having a size of N/2 rows and N columns, with each one of said partitions such that succeeding transformed signal partitions were provided,
  wherein said transform matrix was constructed in the form Mh=[a lr(a) b lr(−1*b)], wherein 'a' and 'b' were sub-matrices each having N/2 rows and N/4 columns and including '+1' and '−1' values only,
  and wherein lr( ) means that columns or elements of a sub-matrix were reversed in order, and wherein 'a' and 'b' were chosen such that a matrix $$MhFull = \begin{bmatrix} a\, lr(a) & b\, lr(-1*b) \\ b\, lr(-1*b) & a\, lr(a) \end{bmatrix}$$

has the rank N,
  whereby said transform matrix multiplication had output N/2 output values per N input values representing a subsampling by a factor of '2', thereby having formed a transformed digital audio signal,
  said apparatus including:
  means which perform a multiplication of an inverse transform matrix invMh, said inverse transform matrix having a size of N rows and N/2 columns, with each one of said transformed signal partitions such that succeeding inversely transformed signal partitions of length N are provided,
  wherein said inverse transform matrix invMH is constructed by taking the left half of the inverse of the matrix $$\begin{bmatrix} a\, lr(a) & b\, lr(-1*b) \\ b\, lr(-1*b) & a\, lr(a) \end{bmatrix},$$

wherein 'a' and 'b' are sub-matrices as defined above;
  means which assemble said inversely transformed signal partitions in an overlapping manner so as to form an inversely transformed digital audio signal,
  whereby said overlapping is of size N/2,
  and whereby the samples values of said inversely transformed signal partitions, or the samples values of said inversely transformed digital audio signal, or the values of said transformed signal partitions are each scaled by multiplication with factor '1/N' or by a division by 'N' or by a corresponding binary shift operation.

5. Method according to claim 1, wherein N equals '8'.

6. Method according to claim 5, wherein said transform matrix has the values:

$$Mh = \begin{bmatrix} 1 & 1 & 1 & 1 & -1 & 1 & -1 & 1 \\ 1 & 1 & 1 & 1 & 1 & -1 & 1 & -1 \\ 1 & -1 & -1 & 1 & -1 & -1 & 1 & 1 \\ 1 & -1 & -1 & 1 & 1 & 1 & -1 & -1 \end{bmatrix},$$

and said inverse transform matrix has the values:

$$invMh = \begin{bmatrix} 1 & 1 & 1 & 1 \\ 1 & 1 & -1 & -1 \\ 1 & 1 & -1 & -1 \\ 1 & 1 & 1 & 1 \\ -1 & 1 & -1 & 1 \\ 1 & -1 & -1 & 1 \\ -1 & 1 & 1 & -1 \\ 1 & -1 & 1 & -1 \end{bmatrix}.$$

* * * * *